(12) United States Patent
Eller et al.

(10) Patent No.: US 11,133,123 B1
(45) Date of Patent: Sep. 28, 2021

(54) PULSE CONTROL DEVICE FOR ELECTROMAGNETIC DEVICES BASED ON INDUCTANCE

(71) Applicant: Base Field Power Limited, Dublin (IE)

(72) Inventors: Sergey Valentinovich Eller, Prague (CZ); Igor Yuryevich Bredikhin, Moscow (RU); Mikhail Petrovich Gorden, Krasnodar (RU)

(73) Assignee: Base Field Power Limited, Dublin (IE)

( * ) Notice: Subject to any disclaimer, the term of this patent is extended or adjusted under 35 U.S.C. 154(b) by 0 days.

(21) Appl. No.: 17/174,691

(22) Filed: Feb. 12, 2021

(51) Int. Cl.
| | | |
|---|---|---|
| *H01H 47/00* | (2006.01) | |
| *H01F 7/06* | (2006.01) | |
| *H02P 5/68* | (2006.01) | |

(52) U.S. Cl.
CPC .............. *H01F 7/064* (2013.01); *H02P 5/68* (2013.01)

(58) Field of Classification Search
None
See application file for complete search history.

(56) References Cited

U.S. PATENT DOCUMENTS

| | | | | |
|---|---|---|---|---|
| 4,095,124 A | * | 6/1978 | O'Farrell, Jr. .......... | H01F 27/40 307/141.4 |
| 5,110,534 A | * | 5/1992 | Yamaguchi ............. | H01F 7/064 376/143 |
| 2009/0201620 A1 | * | 8/2009 | Gray ........................ | H01F 7/18 361/159 |
| 2020/0105448 A1 | * | 4/2020 | Testa ....................... | H01F 7/064 |
| 2020/0317172 A1 | * | 10/2020 | Horton .................... | H01F 7/064 |

\* cited by examiner

*Primary Examiner* — Stephen W Jackson
(74) *Attorney, Agent, or Firm* — Nadya Reingand; Yan Hankin

(57) ABSTRACT

The invention is a pulse control device which combines an electric motor and/or inductors. It can be used in electromagnetic devices and electrical machines, such as electric motors, generators, and transformers, as a control unit in combination with an electric motor and/or a combination of inductors. The invention creates an increase in the efficiency of an electromagnetic device based on inductance while reducing consumption and saving energy consumed from the power supply. In addition, the power supply is additionally protected from self-induction, which increases the reliability of the device. The present invention also discloses a method of saving energy in electromagnetic devices.

9 Claims, 6 Drawing Sheets

PULSE CONTROL DEVICE FOR ELECTROMAGNETIC DEVICES BASED ON INDUCTANCE

CROSS-REFERENCE TO RELATED APPLICATIONS

The present patent application claims priority to Russian patent application No. RU 2020139422 filed Dec. 1, 2020.

FIELD OF THE INVENTION

The invention relates to electrical engineering, in particular to designs of pulse control units in combination with an electric motor and/or inductors, and it can be used in electromagnetic equipment and electrical machines, such as DC motors, generators, transformers, in particular as a control unit in combination with an electric motor and/or inductors.

BACKGROUND OF THE INVENTION

The purpose of the proposed invention is to increase the duration of operation from power sources and reduce the load on the electrical circuits from the power source to the electric machine or transformer.

The scheme of the device for forming an electromotive force (EMF) of self-induction in an inductor is widely known, see FIGS. 1A and 1B. It includes a DC power supply PS, inductance L, electrical load D, and key K. When the key K is closed, the current from the power supply flows through the inductance L, and an electromagnetic field is generated around the inductance L. As a load, for example, an LED can be used, which does not light up because it is connected by reverse polarity. After opening the key K, see FIG. 1B, the current from the PS is interrupted, the magnetic field rolls back into the coil, which causes a potential difference at the ends of the inductance. The LED closes the inductance, which causes a secondary current to occur both in the coil itself and in the LED, and LED will light up for a short time. This method of shunting is widely used to protect keys from self-induction EMF and is also used in almost any pulsed DC motor control unit.

The disadvantage of this method is that part of the self-induction EMF energy is released as heat on the shunt diode, and also partially dissipates into the surrounding space.

The technical result of the proposed solution is to increase the efficiency of an electromagnetic device based on inductance while reducing consumption and saving energy consumed from the power source. In addition, the power supply is additionally protected from self-induction, which increases the reliability of the device.

SUMMARY OF THE INVENTION

This technical result is achieved by the device, which includes a DC power source, PS, one or more inductors, L, a unilaterally conducting element, D1, an electrical load, R, two keys, K1 and K2, and a buffer energy storage, C, wherein the inductor L, by means of the key K1, is connected to the minus of the power source, while the buffer energy storage is connected to the minus of the power source, and the cathode of D1 is connected to the buffer energy storage, C, wherein the electrical load, R, is connected to the cathode of D1 and the cathode of the buffer energy storage, and wherein the electrical load, R, via key, K2, is connected to the plus of the power source and the beginning of the one or more inductors, L. See FIGS. 2-4.

DETAILED DESCRIPTION OF THE PREFERRED EMBODIMENT

The technical result of the present invention is in energy saving for electric motors, pulse transformers, and other electromagnetic devices based on inductance.

Figure 2A:
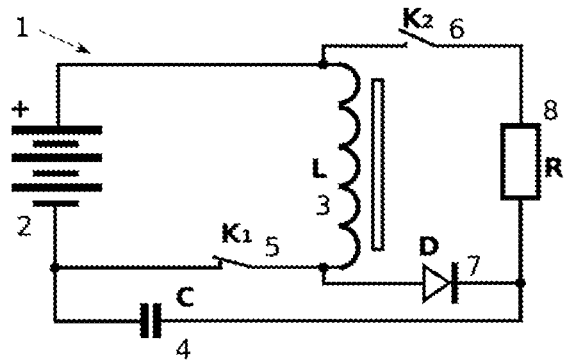
FIG. 2A-2C shows different moments of the proposed device operation. This device provides an efficiency increase by 30-50% compared to the device of FIGS. 1A-1B.
Figure 2B:
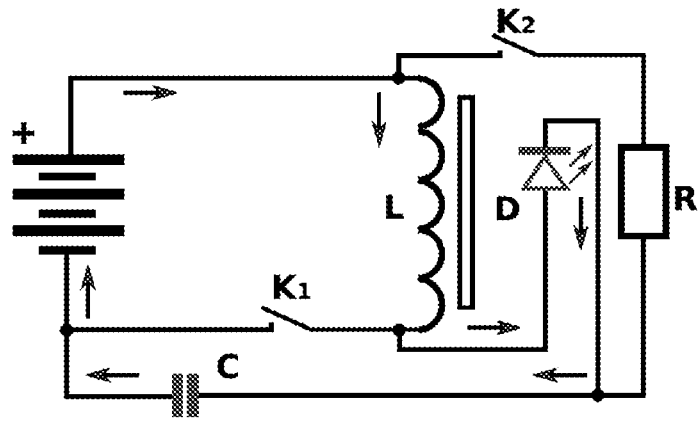
Figure 2C:
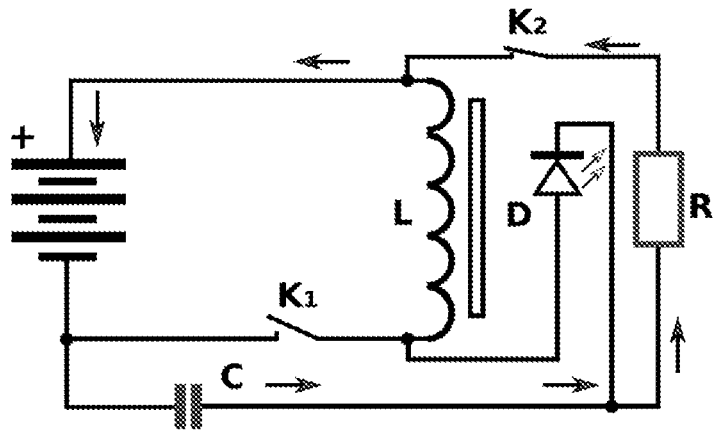

The device 1 includes three circuits, as shown in FIGS. 2A-2C. The first circuit has a power supply (PS) 2, an inductive element (L) 3, and a first key (K1) 5, initially being closed (see FIG. 2A). The second circuit is connected to the same inductive element (L) 3 of the first circuit, the inductive element (L) 3 being connected to an element passing current in one direction (D) 7, which is connected to a buffer energy storage (C) 4, which is in turn connected to a minus of the power supply 2. FIG. 2B shows the second step when the first key (K1) 5 is open, and a second key (K2) 6, being connected to the inductive element (L) 3, is open. The second circuit serves to generate a secondary current in the inductive element (L) 3 of the first circuit, which leads to the formation of a secondary magnetic field around the inductive element (L) 3 and thereby the production of a secondary useful work in the inductive element (L) 3 of the first circuit, as well as in the buffer energy storage (C) 4 of the second circuit. The third circuit includes the buffer energy storage (C) 4, which serves as an energy source, since the voltage level at the buffer energy storage (C) 4 is higher than the voltage level at the power supply 2, which in turn makes it possible to use an energy of the buffer energy storage (C) 4, redirect this energy back to the power supply 2 through the load (R) 8 current when the second key (K2) 6, being connected to the load (R) 8, is closed, and wherein the second key (K2) 6 is connected to the power supply 2, while the first key (K1) 5 is open (See FIG. 2C).

The pulse duration produced by the power supply and the intervals between the pulses are varied, while the pulse duration and the intervals between them determine the reduction in load consumption after passing energy from the power source through the system. In this case, there may be one or more additional inductive elements, L.

The buffer energy storage (C) 4 may be in the form of a capacitor.

Alternatively, the electrical load (R) 8 may comprise a part of an electrical machine, LEDs, transformers, electric motors, and other inductance-based electromagnetic devices.

The general process may further be described as follows. Initially, the first key (K1) is closed (and the second key (K2) is open), and a current flows through the inductor/inductance coil, L. As soon as the current reaches its maximum, the first key (K1) is opened. In the inductance coil, L, a potential difference occurs, since the inductance is shunted through D1, the buffer energy storage C, and the power supply. In a closed loop, an EMF of self-induction occurs, from which the buffer energy storage (C) is charged (see FIG. 2B). The voltage of the buffer energy storage (C) is now higher than the voltage of the power supply. When the current passes through D1 (e.g., when D1 is an LED), a short flash occurs in the LED. Now, the charged buffer energy storage (C), with a voltage higher than the voltage of the power supply, turns into an energy source for the power supply. This ensures an increase in the efficiency of an electromagnetic device based on inductance, while reducing consumption and saving energy consumed from the power source.

When the second key (K2) is closed (see FIG. 2C), the energy from the buffer energy storage (C), through the load (R), is discharged to the power supply. So, we partially compensate for the energy costs from the power supply spent on creating the main pulse, and in case if R is also an LED, R lights up for a short time. This shunt option allows for protecting the first key (K1) from self-induction EMF, useful work is performed in D1 and R, and the energy that was spent on creating the main pulse from the power supply is partially compensated.

Figure 1A:
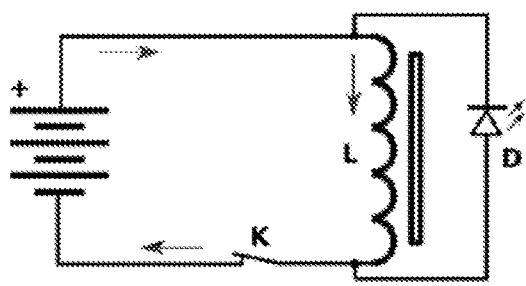
FIGS. 1A and 1B (Prior art) shows a well-known circuit for protecting the key K from a high-voltage self-induction EMF pulse that occurs when the circuit is opened.
Figure 1B:
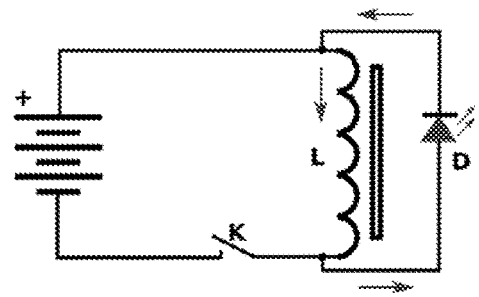

This device provides an efficiency increase of 30-50% compared to prior art devices, which are exemplified in FIGS. 1A-1B.

Various implementations of the proposed devices are disclosed below.

Figure 3A:
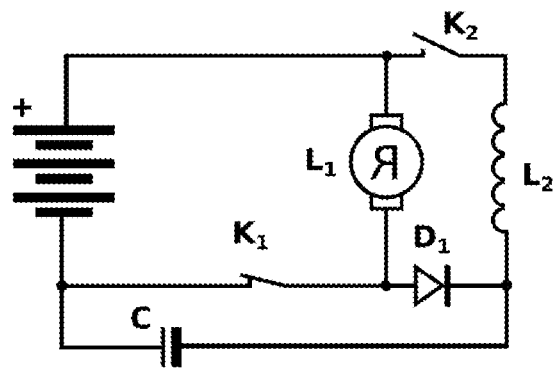
FIG. 3A-3C shows implementation of the proposed device for a brushed motor with independent excitation winding.
Figure 3B:
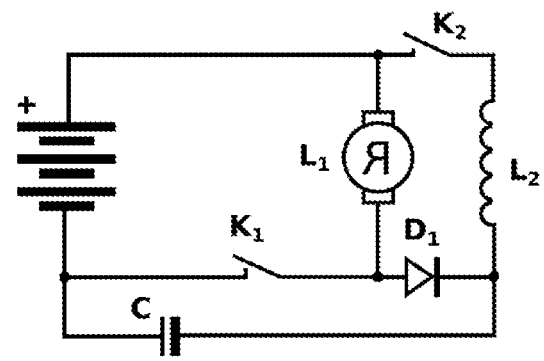
Figure 3C:
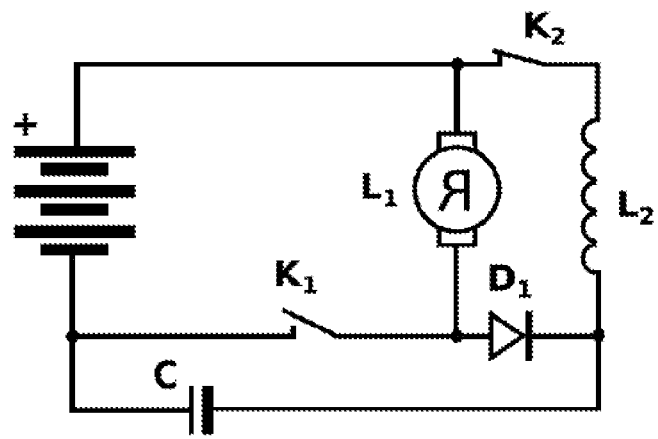

FIGS. 3A-3C show an implementation of the proposed device for any brushed motor/engine having an independent excitation winding. The operation of the proposed device is as follows. When the power supply is turned on, the voltage in the capacitor is equalized to the level of the power supply. Before starting the engine, both keys are open.

After closing the first key, a current appears in the circuit comprising the power supply, the motor armature, and the first key (FIG. 3A). When the current reaches its maximum value, the first key is opened (see FIG. 3B). The current no longer flows in the first circuit, and a potential difference (EMF of self-induction) appears in the windings of the motor rotor exceeding the voltage of the power source. The second circuit, comprised of the windings of the motor rotor (L1), diode (D1), capacitor (C) and the power supply has a current flow. The capacitor is charged. Once the capacitor voltage becomes higher than the voltage of the power supply, the second key is closed (see FIG. 3C). The current flows in the third circuit consisting of a capacitor (C), an excitation winding (L2), the second key (K2) and the power supply. The capacitor (C) is discharged through the excitation windings (L2) and the second key (K2) in the power supply until the voltage level with the power supply is equalized. When the voltage is equal, the second key (K2) is opened. The cycle is completed, and all steps are repeated after the first key (K1) is closed.

Figure 4A:
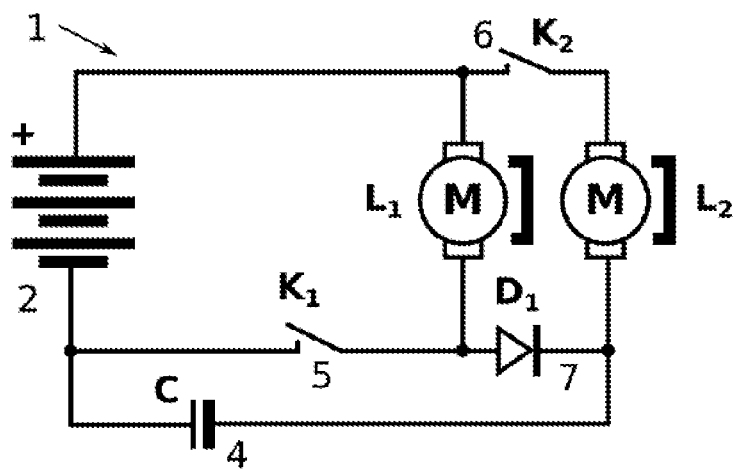
FIG. 4A-4C shows implementation of the proposed device for two permanent magnet motors.
Figure 4B:
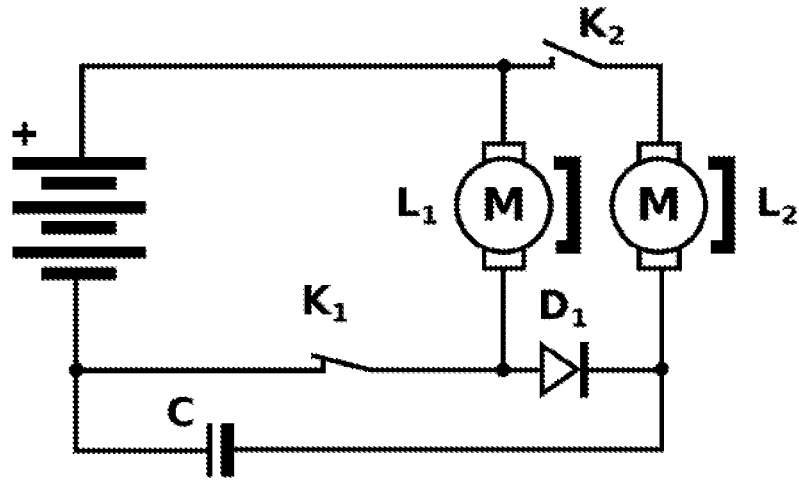
Figure 4C:
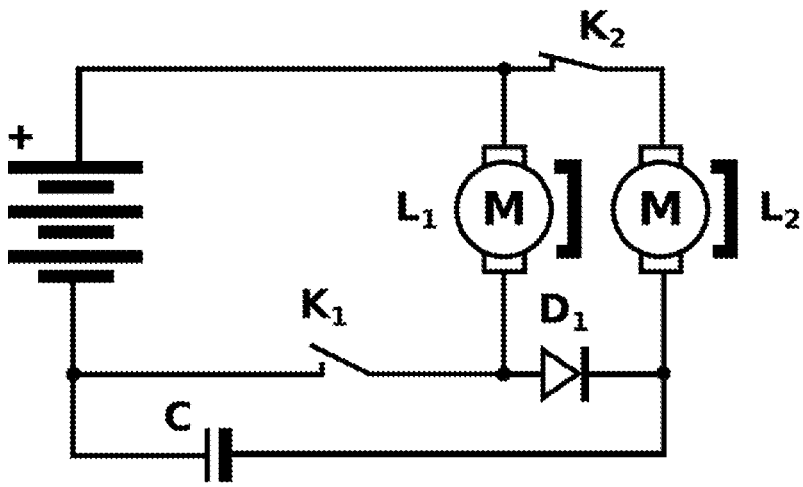

FIGS. 4A-4C show an implementation of the proposed device for two permanent magnet motors M. The operation of the proposed device is as follows. When the power supply 2 is turned on, the voltage in the capacitor 4 is equalized to the level of the power supply. Before starting the engine, the keys 5 and 6 are open.

After closing the first key (K1) 5, a current appears in the circuit comprised of the power supply 2, the motor armature 3, and the first key 5 (FIG. 4A). When the current reaches its maximum value, the first key 5 is opened (FIG. 4B). The current no longer flows in the first circuit, and a potential difference (EMF of self-induction) appears in the windings of the first motor rotor L1 exceeding the voltage of the power supply. The second circuit, comprised of the windings of the first motor rotor (L1), diode 7 (D1), capacitor 4 (C) and the power supply 2 has a current flow. The capacitor 4 is charged. Once the capacitor voltage becomes higher than the voltage of the power supply, the second key 6 is closed (FIG. 4C). The current flows in the third circuit, which comprises the capacitor 4 (C), the second motor rotor (L2), the second key 6 (K2), and the power supply 2. The capacitor 4 (C) is discharged through the second motor rotor (L2) and the second key 6 (K2) in the power supply until the voltage level with the power supply is equalized. When the voltage is equal, the second key 6 (K2) is opened. The cycle is completed, and every step is repeated after the first key 5 is closed.

Figure 5A:
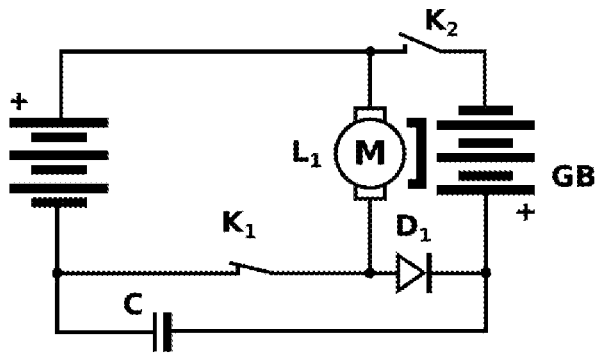
FIG. 5A-5C shows implementation of the proposed device for a permanent magnet motor and a galvanic energy storage.
Figure 5B:
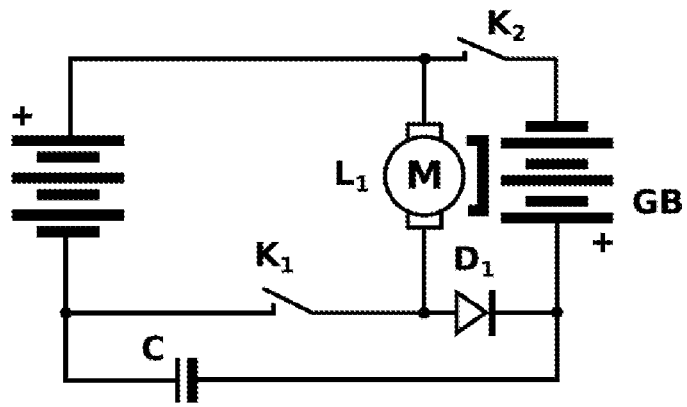
Figure 5:
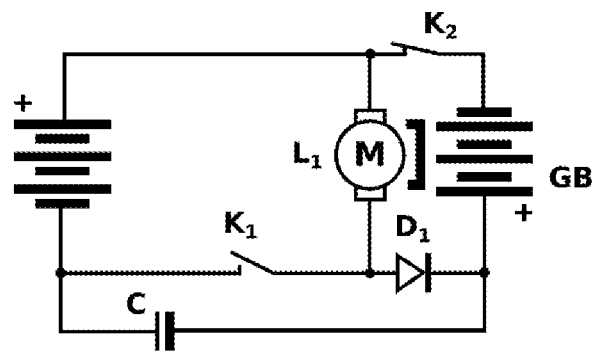

FIGS. 5A-5C show an implementation of the proposed device for a permanent magnet motor and a galvanic energy storage. The operation of the proposed device is as follows. When the power supply is turned on, the voltage in the capacitor is equalized to the level of the power supply. Before starting the engine, both keys are open.

After closing the first key, a current appears in the circuit comprised of the power supply, the motor armature, and the first key (FIG. 5A). When the current reaches its maximum value, the first key is opened (FIG. 5B). The current no longer flows in the first circuit, and a potential difference (EMF of self-induction) appears in the windings of the motor rotor exceeding the voltage of the power source. The second circuit, comprised of the windings of the motor rotor (L1), diode (D1), capacitor (C), and the power supply has a current flow. The capacitor is charged. Once the capacitor voltage becomes higher than the voltage of the power supply, the second key is closed (FIG. 5C). The current flows in the third circuit consisting of a capacitor (C), the galvanic energy storage (GB), the second key (K2), and the power supply. The capacitor (C) is discharged through the galvanic energy storage (GB) and the second key (K2) in the power supply until the voltage level with the power supply is equalized. When the voltage is equal, the second key (K2) is opened. The cycle is completed, and every step is repeated after the first key (K1) is closed.

Figure 6A:
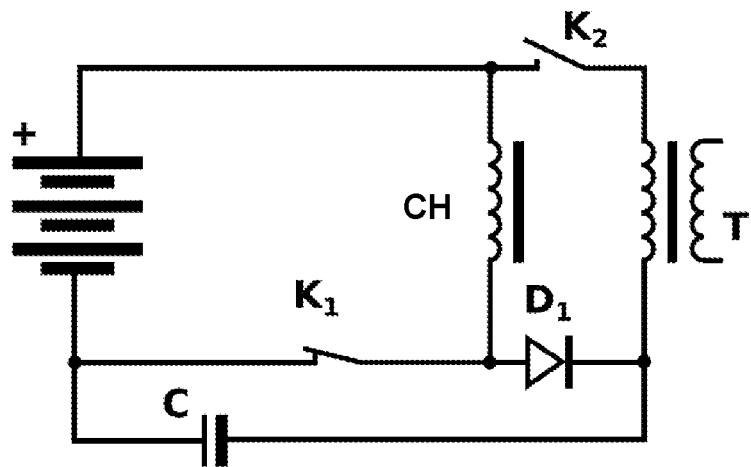
FIG. 6A-6C shows implementation of the proposed device for a choke and a transformer.
Figure 6B:
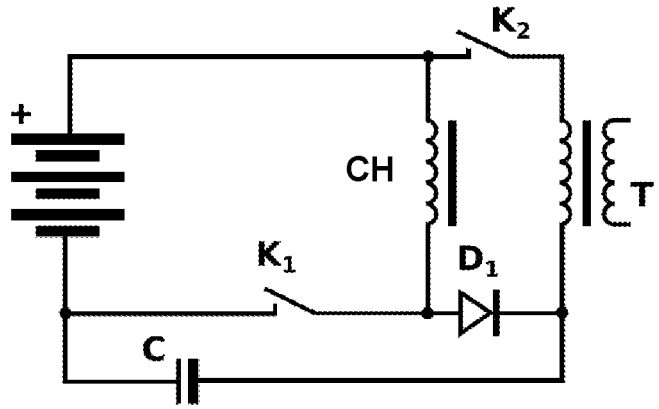
Figure 6:
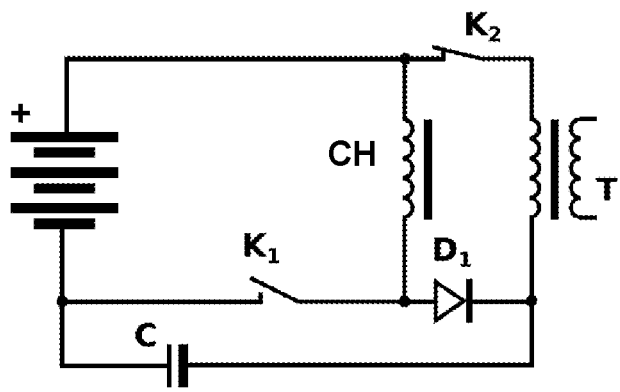

FIGS. 6A-6C shows implementation of the proposed device for a choke and a transformer. The operation of the proposed device is as follows. When the power supply is turned on, the voltage in the capacitor is equalized to the level of the power supply. Before starting the engine, both keys are open.

After closing the first key, a current appears in the circuit consisting of the power supply, the choke (CH), and the first key (K1) (FIG. 6A). When the current reaches its maximum value, the first key (K1) is opened (FIG. 6B). The current no longer flows in the first circuit, and a potential difference (EMF of self-induction) appears in the windings of the choke (CH) exceeding the voltage of the power source. The second circuit, consisting of the windings of the choke (CH), diode (D1), capacitor (C), and the power supply has a current flow. The capacitor is charged. Once the capacitor voltage becomes higher than the voltage of the power supply, the second key (K2) is closed (FIG. 6C). The current flows in the third circuit consisting of the capacitor (C), the transformer (T), the second key (K2), and the power supply. The capacitor (C) is discharged through the transformer (T) and the second key 6 (K2) in the power supply until the voltage level with the power supply is equalized. When the voltage is equal, the second key (K2) is opened. The cycle is completed, and every step is repeated after the first key (K1) is closed.

As described and illustrated, the present invention comprises: a first circuit, a second circuit, and a third circuit, the first circuit comprising: a power supply, an inductive element, and a first key in a closed position; the second circuit comprising: the power supply, the inductive element, an element passing current in one direction, a buffer energy storage, and the first key in an open position, the second circuit generating a secondary current in the inductive element, the secondary current forming a secondary magnetic field around the inductive element and thereby a production of a secondary useful work in the inductive element and in the buffer energy storage, the element passing current in one direction being connected to the inductive element, the buffer energy storage being connected to a minus of the power supply via the first key, the second circuit further comprising a second key in an open position, the second key being connected the inductive element and an electrical load, the electrical load being connected to the buffer energy storage and the element passing current in one direction; the third circuit comprising: the power supply, the buffer energy storage, the electrical load, the second key in a closed position, and the first key in an open position.

In some aspects, the device comprises a core installed inside the inductive element, or the element passing current in one direction is a semiconductor diode, or the first key, via a closing and opening of the first circuit, generates pulses, wherein a frequency of pulses and a range of pulses is determined based on properties of the inductive element, or the power supply is a direct current (DC) power supply, or the inductive element comprises a part of an engine, and the electrical load comprises an independent excitation winding of the engine, or the inductive element and the electrical load are permanent magnet motors, or the inductive element comprises a part of a permanent magnet motor, and the electrical load is a galvanic energy storage, or the inductive element is a choke, and the electrical load is a transformer.

The description of a preferred embodiment of the invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What is claimed is:

1. A device, comprising:
   a first circuit, a second circuit, and a third circuit,
   the first circuit comprising:
      a power supply,
      an inductive element, and
      a first key in a closed position,
   the second circuit comprising:
      the power supply,
      the inductive element,
      an element passing current in one direction,
      a buffer energy storage, and
      the first key in an open position,
   the second circuit generating a secondary current in the inductive element, the secondary current forming a secondary magnetic field around the inductive element and thereby a production of a secondary useful work in the inductive element and in the buffer energy storage,
   the element passing current in one direction being connected to the inductive element,
   the buffer energy storage being connected to a minus of the power supply via the first key,
   the second circuit further comprising a second key in an open position, the second key being connected the inductive element and an electrical load, the electrical load being connected to the buffer energy storage and the element passing current in one direction,
   the third circuit comprising:
      the power supply,
      the buffer energy storage,
      the electrical load,
      the second key in a closed position, and
      the first key in an open position,
   wherein the buffer energy storage remains greater than zero throughout, thereby charging the power supply.

2. The device according to claim 1, further comprising a core installed inside the inductive element.

3. The device according to claim 1, wherein the element passing current in one direction is a semiconductor diode.

4. The device according to claim 1, wherein the first key, via a closing and opening of the first circuit, generates pulses, wherein a frequency of pulses and a range of pulses is determined based on properties of the inductive element.

5. The device according to claim 1, wherein the power supply is a direct current (DC) power supply.

6. The device according to claim 1, where the inductive element comprises a part of an engine, and wherein the electrical load comprises an independent excitation winding of the engine.

7. The device according to claim 1, wherein the inductive element and the electrical load are permanent magnet motors.

8. The device according to claim 1, wherein the inductive element comprises a part of a permanent magnet motor, and wherein the electrical load is a galvanic energy storage.

9. The device according to claim 1, wherein the inductive element is a choke, and wherein the electrical load is a transformer.

* * * * *